March 16, 1965 V. BLANCATO 3,173,270
PIER FENDERS

Filed Oct. 19, 1961 6 Sheets-Sheet 1

INVENTOR.
VIRGIL BLANCATO
BY
ATTORNEY

March 16, 1965  V. BLANCATO  3,173,270
PIER FENDERS

Filed Oct. 19, 1961  6 Sheets-Sheet 3

INVENTOR.
VIRGIL BLANCATO
BY
*Max D. Farmer*
ATTORNEY

March 16, 1965 V. BLANCATO 3,173,270
PIER FENDERS
Filed Oct. 19, 1961 6 Sheets-Sheet 4

INVENTOR.
VIRGIL BLANCATO
BY
ATTORNEY

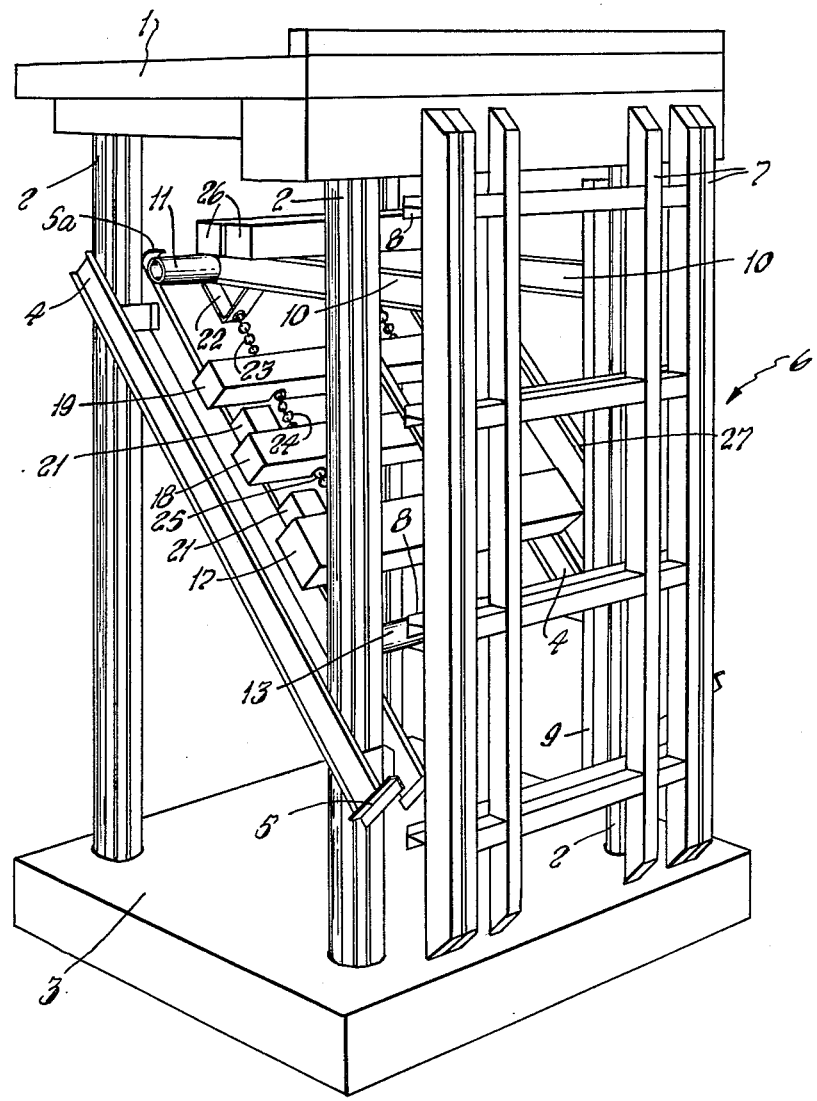

United States Patent Office 3,173,270
Patented Mar. 16, 1965

3,173,270
PIER FENDERS
Virgil Blancato, 201 Clinton Ave., Brooklyn 5, N.Y.
Filed Oct. 19, 1961, Ser. No. 146,381
10 Claims. (Cl. 61—48)
(Granted under Title 35, U.S. Code (1952), sec. 266)

The invention described herein may be manufactured and used by or for the Government of the United States of America for governmental purposes without the payment of any royalties thereon or therefor.

This invention relates to shock absorbing structures, particularly to marine pier fenders for absorbing the impact shocks between a pier and a vessel being berthed at that pier, and is in the nature of an improvement upon my Patent #2,892,315 issued June 30, 1959.

Marine pier fenders are used to absorb the impact forces between a pier or relatively stationary or fixed upstanding structure and a large floating object such as a ship, barge or the like, that may be berthed against the pier or structure. The fenders also provide the necessary protection for both the pier and the vessel. Many fender systems have been proposed, but have not gone into extensive use for various reasons, such as, for example, high initial cost, difficulty of application to existing piers, costly maintenance, inadequate energy absorption properties, and combinations of these reasons.

An object of the invention is to provide an improved shock absorbing construction which offers resistance to impact forces that increases progressively with increasing impact forces.

Other objects are to provide an improved marine pier fender construction for absorbing the impact energies of berthing vessels against a pier, and providing protection from such energies for the pier and vessels, which can be easily and inexpensively applied to existing piers or incorporated in new pier constructions, which offers progressively greater resistance to impact of a vessel thereagainst with greater extents of movement of the fender under the impact thereagainst of a vessel being berthed at that pier, so that the resistance to impact offered by the fender will be as gentle as possible but adequate to absorb strong impact forces when necessary without damage to the pier and vessel, and which is relatively simple, strong, compact, structurally durable, efficient, practical, and inexpensive in construction.

Another object is to provide an improved marine pier fender construction which is adapted for easy, rapid and economical installation in both old and new piers, which may be largely prefabricated before its installation, which requires minimum maintenance, and which may be made in units applicable in separate units that may be easily applied side by side to a pier of any length.

Other objects and advantages will appear from the following description of one example of the invention, and the novel features will be particularly pointed out in connection with the appended claims.

In the accompanying drawings:

FIG. 7 is a similar perspective but illustrating the changed positions of the parts as the result of an impact against the face of the fender by a vessel being berthed.

When a vessel is berthing, a certain amount of kinetic energy is imparted to the pier or mooring platform. This energy is a function of the weight of the vessel and the velocity of approach.

To avoid damage to the pier, dock, or mooring platform, and to the vessel, it is customary to front the pier or platform with some type of fendering or buffer that is intended to absorb all or part of this energy.

The fendering system in accordance with this invention, employs an impact element supported in front of the pier face to be protected, on inclined rails carried by the pier, so that when this impact element is engaged by outside forces, such as by the impact of a vessel thereagainst, it can move backwardly and upwardly so as to absorb a degree of energy depending on the forces required to move the impact element, and the length of its travel. The force required to move the impact element is a function of the weight of the impact element, the inclination of the plane on which the impact element travels, and the frictional coefficient of the elements in contact during the sliding movement.

If the impact element is very heavy, the force required to initiate its movement must be great and possibly in excess of the resisting capacity of the material that comes in contact with the vessel. Damage to the fender and ship could result. To avoid this possibility, the weight of the impact element must be sufficiently light so that its upward movement may be initiated under a relatively small impact force. Additional means, such as weights, independently of the impact element, which can be made effective in succession by the impact element at successive intervals, serve to increase gradually the resistance to the acting forces with continued movement of the impact element, so that before the end of the possible travel of the impact element, the various units of fendering in contact with the vessel and the additional means, would have absorbed the kinetic energy required for the berthing of the vessel. With this type of yieldable fender, the required length of travel is solely limited by the structure of the pier and the tied range.

Figure 5:
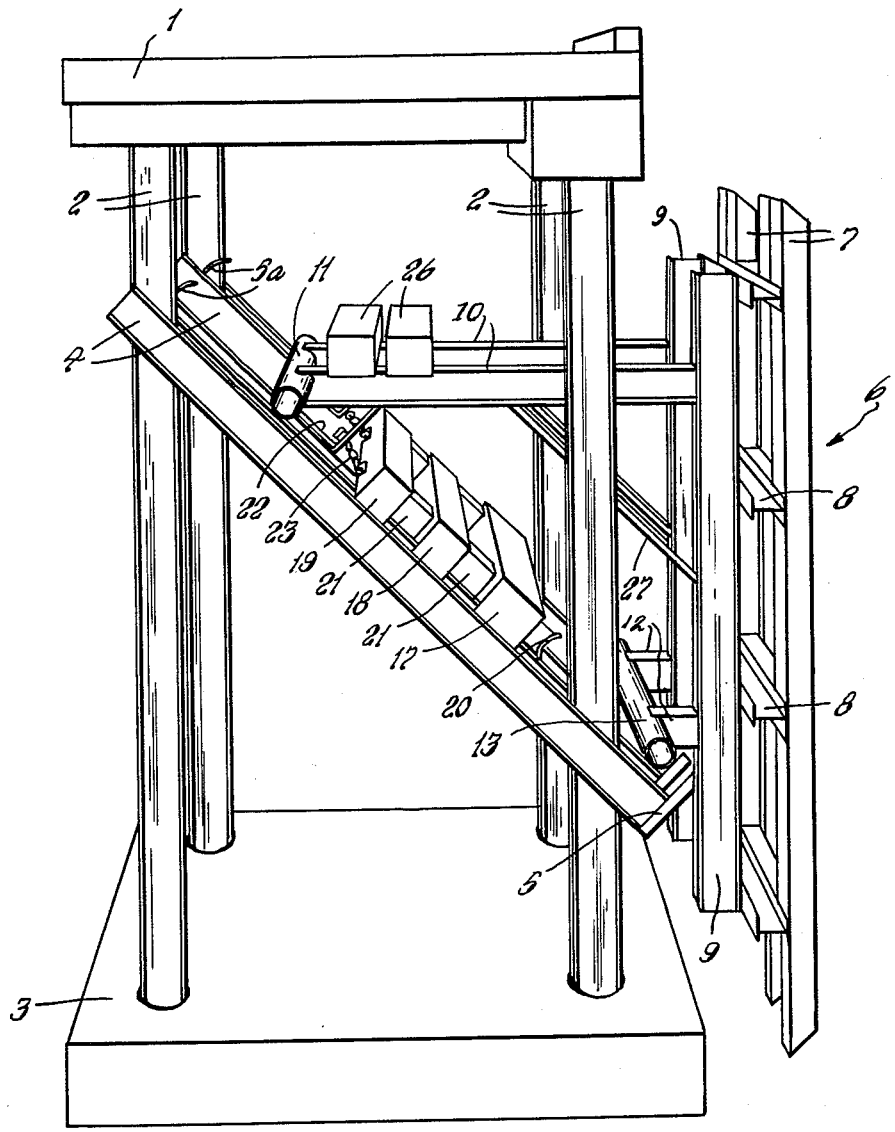
FIG. 5 is a side perspective of a model illustrating the principle of operation of my fender.
Figure 6:
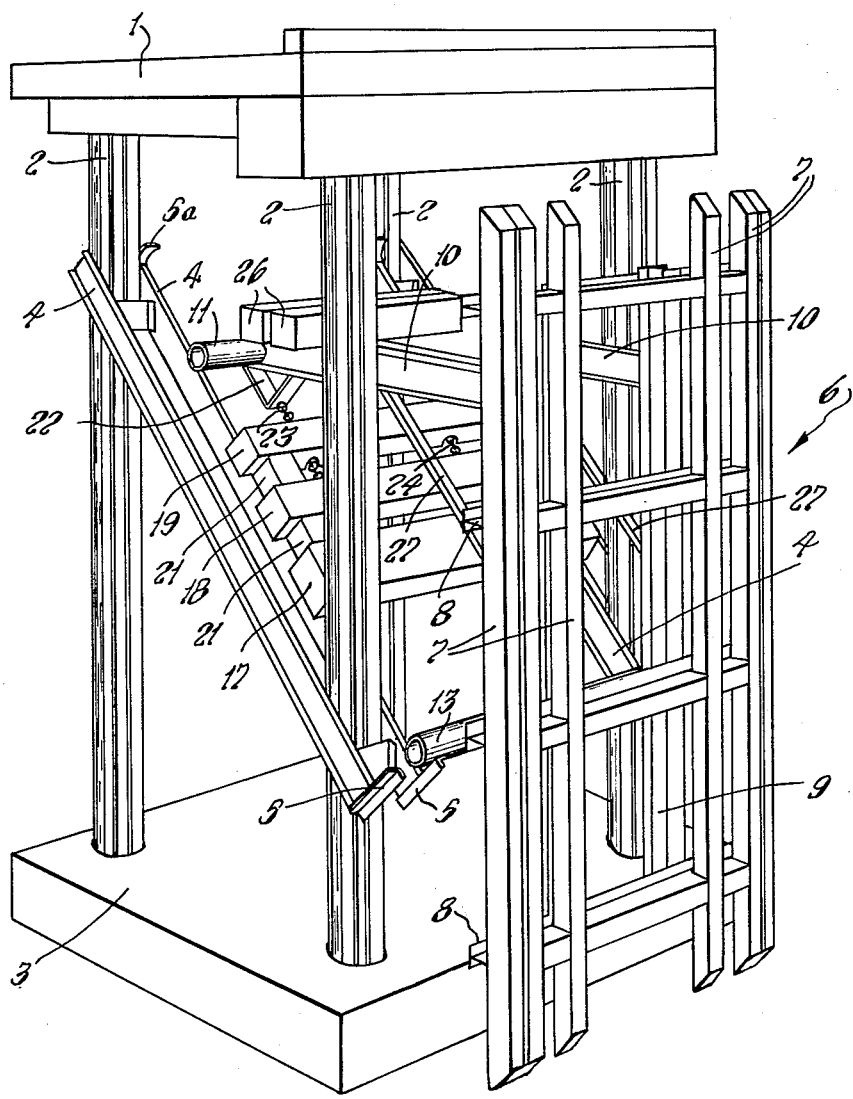
FIG. 6 is a corner perspective of such model, illustrating the positions occupied by the parts before an impact of a vessel thereagainst.

Referring first to FIGS. 5 to 7, which represent different views of a simple model constructed to illustrate the principle of this invention, such model represents one example of one unit of the improved fendering system. The pier or mooring platform is represented in this model by the platform 1, corresponding to the platform of the pier, from which piles 2 depend. In the model, these piles 2 are supported by a wooden base 3 but in practice they are driven into the ground or otherwise supported as usual in pier and mooring platform constructions. Rails 4 are carried by front and rear piles 2 on each side face of the piles, parallel to one another, in inclined positions in which they extend upwardly and rearwardly from the front face of the pier or platform. These rails 4 are fixed in these parallel, inclined positions, one pair of rails between each pair of front piles 2. Each rail at its lower end has a stop 5 projecting upwardly therefrom, and at its rear end a similar stop 5a projecting upwardly therefrom, for purposes which will appear presently. An impact element 6 is disposed in front of the face of the pier against which a vessel is to be berthed, and has an upstanding wall formed of upright strips 7 which are carried by a plurality of cross members 8 (FIG. 6). These members 8 extend crosswise between the strips 7 at a plurality of intervals up the strips, and are in turn carried by upstanding members 9 disposed side by side but spaced apart horizontally and extending parallel to the strips 7. The distance between the uprights 9 is less than the distance between the adjacent front posts 2. The strips 7, cross members 8, and upstanding members 9 collectively may be considered to be an impact wall of the impact element 6.

Beams 10 are fixed rigidly to and extend rearwardly from the posts or upright members 9, rearwardly between the front pier posts 2, and at their rear ends are fixed to cross-bar 11 and 13, near each end therof, so as to de-slides on the adjacent rails 4. These beams serve as rearward extensions from the impact wall. Short extensions 12 extend rearwardly from the upright members 9, near their lower ends, and at their rear ends are fixed to a cross-bar 13 which extends between and slides on top of the rails 4 that are provided between the front and rear posts 2. The impact element includes the upstanding strips 7 against which a vessel may bump while being berthed, the cross members 8, the upright members 9, the rearward extensions 10 and 12, and the cross-bars 11 and 13 which slide on the rails.

Figure 4:
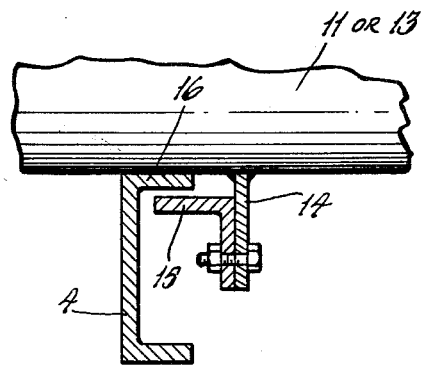
FIG. 4 is a sectional elevation of certain details illustrating one manner in which the bars can be confined to the rails for sliding movement only thereon.

The cross-bars 11 and 13 are confined against the top surface of the rails by any suitable means, one of which is illustrated in FIG. 4. A plate 14 is secured to each cross-bar 11 and 13, near each end therof, so as to depend along a face of the rail, and at its depending end it carries an angle member 15 which extends beneath a flange 16 of the rail that forms a rail surface on which the cross-bars slide. Each rail is therefore preferably formed of a channel bar disposed on edge so that one side or flange 16 of the beam will serve on its outside face as the rail on which the bars 11 and 13 slide.

Angle member 15, which engages beneath the flange 16 prevents movement of the bars 11 and 13 away from the rail surface or flange 16 in directions crosswise of the length of the rail, yet permit sliding movement of the bars 11 and 13 along the rail. The stops 5 and 5a on the rail serve to limit the movement of the bars 11 and 13 up and down the rails. When a vessel bumps the impact element 6, it pushes such element toward the pier, so that it is guided up the rails.

The weight of the impact element tends to resist this upward movement and offers a substantial resistance to the impact forces created by the bumping of the vessel against the impact element. The friction offered by the sliding of the bars 11 and 13 up the rails also opposes the impact forces applied to the impact element by the bumping of a vessel against the outer face of the impact element. In order that the resistance to the impact forces created by a vessel bumping against the impact element may be gentle at first and increase progressively with different extents of movement of the impact element, under the impact forces, provision is made to offer increasing resistance to the upward travel of the impact element on the rails. For this purpose a plurality of weight members 17, 18 and 19 extend horizontally between the rails and slide up and down the rails in a manner which will appear shortly.

These members 17, 18 and 19 are made relatively heavy such as of metal or concrete, and are of substantial size. The weights of these members may increase in the order they are arranged downwardly on the rails, so that the lightest one will be the highest of any on the rails. The next one will be slightly heavier, and the next one still heavier. Stops 20 are provided on the rails intermediate of their ends so as to limit the downward movement of the lower member 17. Each of these weight members, on its upper side, carries at each end a spacer 21 which, when the weights slide down the rails into contact with one another, keeps the weights apart some distance for a reason which will appear shortly.

On the underneath of each rearward extension 10, at its rear end, is a depending V-shaped member 22. One side of the V is approximately parallel to the rails. Chains 23 connect the apex of each of these V-shaped members to the upper weight member 19, with some slack in the chains when the impact element is at its lower limit of movement on the rails, as determined by the stops 5 at the lower end of the rail. Similarly, chains 24 are provided between bars 18 and 19, near their ends, with some slack in the chains when the bar 19 engages against the spacer 21, on the upper side of the weight member 18. Similar chains 25 are provided between the weight members 17 and 18 near the ends thereof, with some slack in such chains when the weight member 18 is in contact with the spacers 21 on the upper side of the lower weight member 17. When the impact element is at its lower limit of movement, the weight members 17, 18 and 19 will be in contact, through the spacers 21, with one another and detained against further downward movement by the stops 20. When a vessel bumps against the impact element and pushes it toward the pier, such element will ride up the rails and offer some resistance to such movement. In this initial movement of the impact element, the weight of the impact element and the friction of bars 11 and 13 on the rails offers the resistance to the impact forces and the slack in the chains 23 will be taken up. Then further movement of the impact element up the rails will be also opposed by the weight of the weight member 19, which is dragged by the impact element up the rails. The weight of member 19 and its friction on the rails determines the added opposition to the impact forces that were applied against the impact element when the vessel bumped against it.

After a selected increment of movement of the weight 19 with the impact element up the rails, the slack will be taken out of the chains 24, and then the weight member 18 will be picked up and dragged up the rails along with weight member 19. The added weight of weight member 18 and its sliding friction on the rails determines the still further added resistance to the movement of the impact element. After a selected increment of movement of the impact element with both members 18 and 19, the slack in the member 25 will be taken up and then further movement of the impact element will pick up and drag up the rails the lowermost weight member 17, thus adding further additional resistance to the continued movement of the impact element, which is proportional to the added weight of the member 17 plus the sliding friction created by the drag of this weight member 17 up the rails.

It will thus be observed that the resistance to the bumping of a vessel against the impact element will at first be moderate, and then the resistance becomes progressively greater with greater extents of movement of the impact element up the rails. This adds additional resistances as necessary to absorb the greater shocks, and of course the complete movement is limited by engagement of the bar 11 with the upper stop 5a and with the engagement of the lower bar 13 with the stop 5. It will be noted that the weight members 17, 18 and 19 are disposed on the rails in the area thereof between the upper and lower bars 11 and 13 of the impact element, which is outside of the area of travel by the cross-bars 11 and 13 during the expected movement of the impact element when a vessel bumps into the latter.

It will be noted that the weight of the impact element tends to rock it about the cross bar 13 as a fulcrum and carry the upper cross-bar 11 away from the rails, but this movement is prevented by the enaggement of the angle members 15 with the flanges 16 of the rails. However, to partially counterbalance this tendency of the impact element to rock on the cross-bar 13 and to add to the weight of the impact element, one or more further weights 26 are disposed between and carried by the extensions 10 of the impact element in proximity to the cross-bar 11. This loading by weights 26 not only tends to counterbalance or oppose the tendency of the impact element to rock on the bar 13 as a fulcrum, but it also adds weight which must be lifted when the impact element is moved upwardly due to the bumping of a vessel against it. These weights 26 may be of metal, concrete or any suitable heavy material, and the number and size may be varied in accordance with the desired additional added weight. Braces 27 are provided between each extension 10 and the upright member 9 to which the extension 10 is connected, so as to form a structure with the necessary rigidity to withstand impact shocks when a vessel bumps into the face of the impact element.

Figure 1:
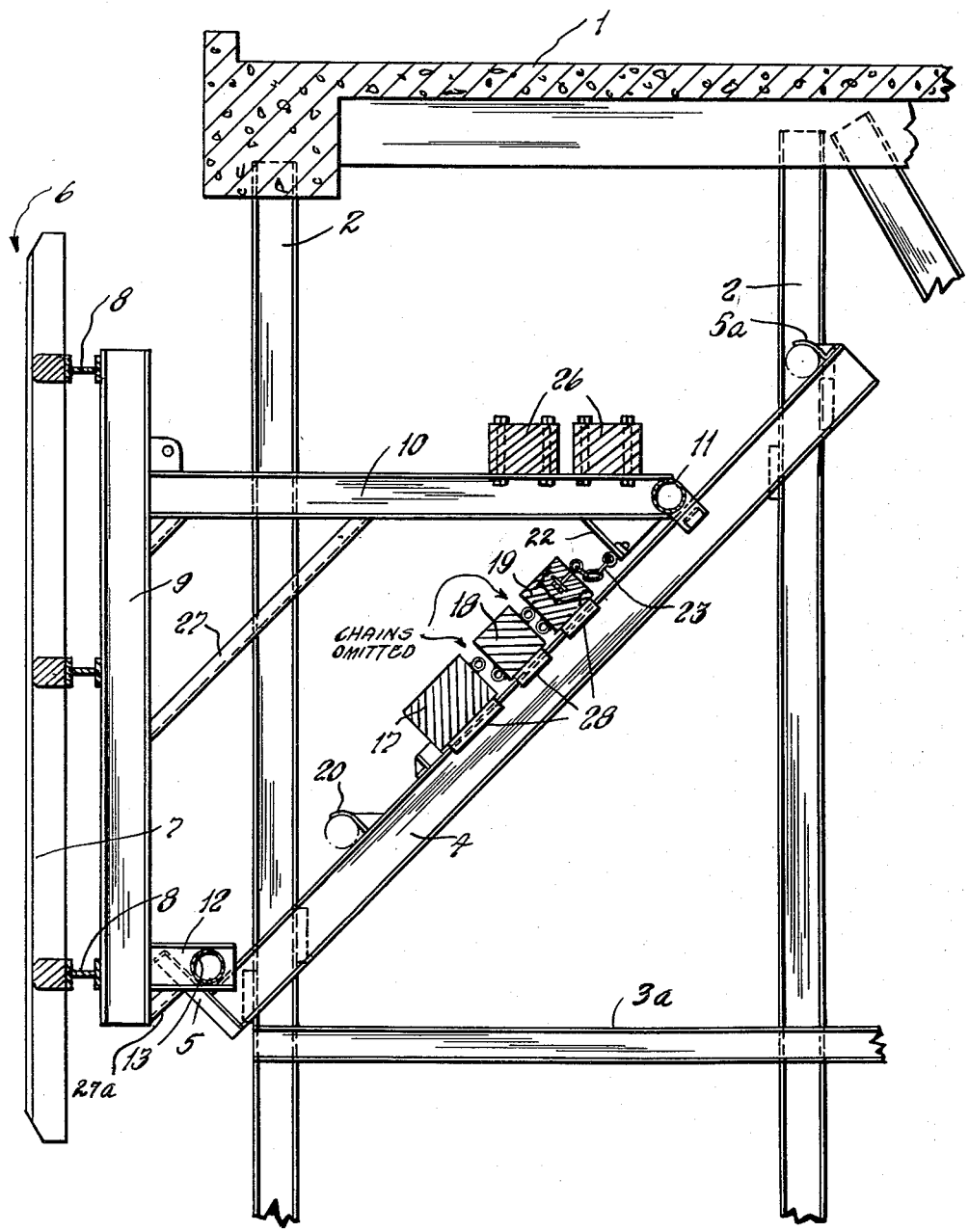
FIG. 1 is a sectional elevation through a pier in which has been incorporated a fender unit constructed in accordance with this invention, the section being taken through the unit approximately along the line A—A of FIG. 2.
Figure 2:
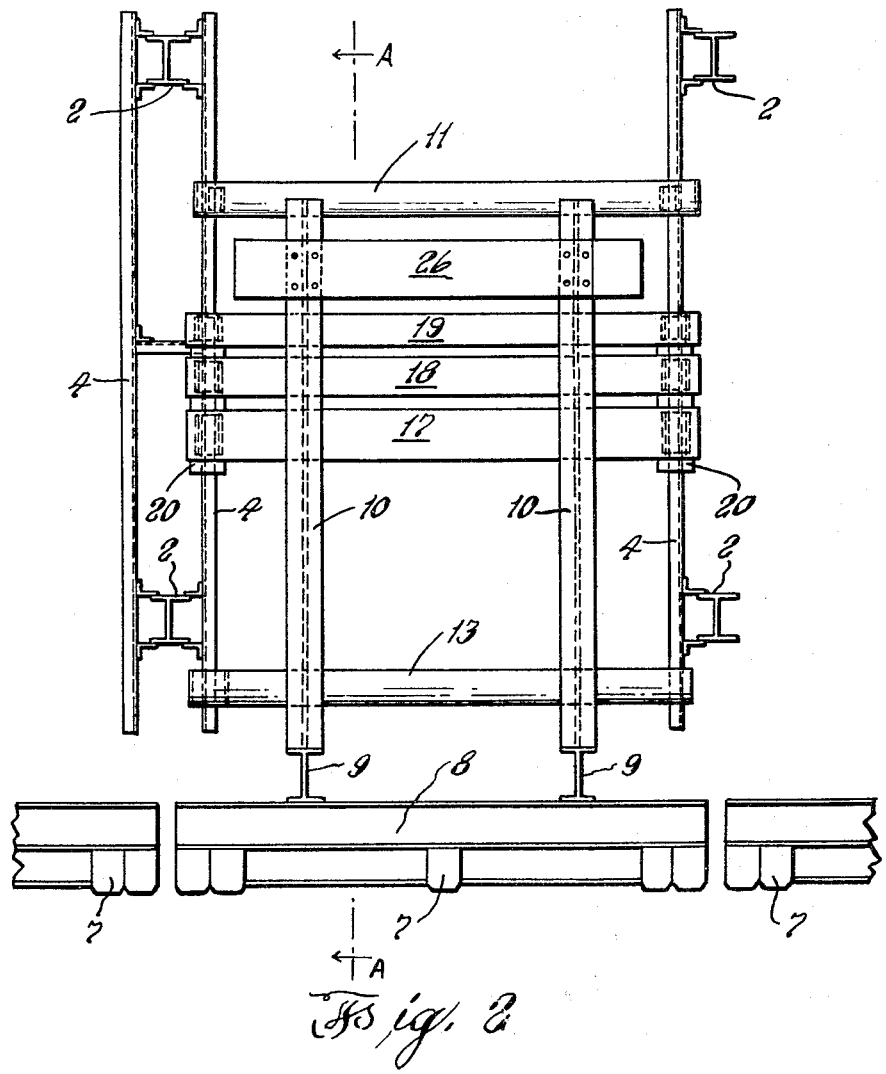
FIG. 2 is a plan of one fender unit to be applied to a pier.
Figure 3:
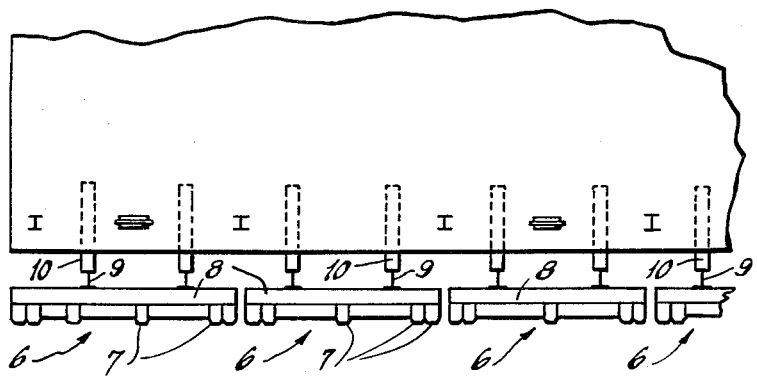
FIG. 3 is a schematic plan of part of a pier showing how my fender units may be assembled along the side of a pier to provide complete protection for the pier.

Referring next to the example of the invention illustrated in FIGS. 1, 2, and 3, the weighted members 17, 18, and 19 have flanges 28 which engage beneath the rails or flanges 16 thereof, so that such weighted members cannot accidently separate from the rails. As one example of a workable fender system, the possible horizontal retraction of the impact element may be approximately 4 ft. which would correspond to a linear travel of the impact element on the rails of approximately 6 ft. 9 inches, and the chains are connected to weighted members 17, 18 and 19 to give a slack of approximately 6 inches between the members. The lengths of the rails may be approximately 26 ft. between stops 5 and 5a. In the example illustrated, the angle of inclination of the rails is approximately 45 degrees, but this angle may be varied above and below 45 degrees to some extent, depending upon the desired resistance to be offered to the forces of impact against the impact element.

A plurality of impact units such as shown in FIGS. 1 and 2, for example, are arranged side by side along the length of the pier in order to provide protection for vessels and piers of different lengths. While reference has been made to the application of this invention to piers, it will be understood that it is also applicable to mooring islands for ships, ship tankers, barges or the like that may be berthed against the pier or structure. These impact absorbing units may be provided upon both sides of the mooring island or pier. Since the units arranged along a mooring island or pier are individual and separate units, they may be largely prefabricated and assembled side by side as shown in FIG. 3, and if one is damaged or in need of repairs, it can be very easily replaced with a new unit or changes or repairs made to an individual unit in situ.

It will be noted that an important factor which influences the energy absorption capacity of each unit is the frictional resistance due to the sliding contact of the bars 11 and 13 and the weighted members 17, 18, and 19 with the rails. It is therefore desirable to have the weights and bars slide on the rails instead of rolling thereon. After the impact element has been pushed rearwardly and upwardly by the impact therewith of a vessel, the weight of the element and the weighted members 17, 18, 19, and 26 will urge the impact element away from the pier and will tend to push the vessels slowly away from the pier until the impact element has returned to its normal lowered position.

During the period in which the impact element returns to its normal lower position, the weighted members 17, 18 and 19 will be progressively stopped, one by one, by increments as the impact element descends, so that the push on the vessel which is against the impact element will decrease progressively after the vessel is started in its movement away from the pier. With such an arrangement, with the force returning the impact element to its normal position decreasing, the vessel is not pushed as far away from the pier as would occur if the same weight of the impact element and its weighted members 17, 18, 19, and 26 all exerted their forces against the vessel for the full descent of the impact element.

It will be noted that the slack chain connections between the rearward extensions of the impact element and the uppermost weighted member 19, as well as between the weighted members 17, 18, and 19, constitute and function as lost motion connections and are examples of lost motion connections that may be employed. While loose rods of an appropriate length may be employed as lost motion connections, the chains are a simple and inexpensive manner of obtaining the desired lost motion in the connections, and the amount of the slack determines the increments of movements during the inward and upward movement of the impact element when the weighted members progressively become effective. The weighted members 17, 18, 19 and 26 may be formed of any suitable material such as reinforced concrete, stone or metal in any form or size to suit local conditions.

If desired, adjacent impact elements may be tied together by means of loose connectors, so that one moving impact element may initiate the movement of another adjacent element without impairing its full retraction when needed. By having the rails of substantial lengths, it is possible to provide for a larger extent of movement of the impact element, and consequently, a more gradual but increasing opposition to the impact forces as a vessel bumps against the impact element. Since the rate of energy absorbed increases with the extent of movement of the impact element, it is suitable for berthing of small and large ships. The energy of the impact is distributed to many units of the system and through them to a large area of the pier, making it useful for open piers of light constructions.

In FIGS. 1–4, the parts which correspond to parts in the model shown in FIGS. 5, 6 and 7, have been designated by corresponding reference numerals. In place of the base 3 of the model, the piles 2 are connected, at levels just below the lower ends of the rails 4, with bars 3a which extend forwardly and rearwardly between and are fixed to the forwardly and rearwardly aligned piles 2 to form a rigid structure, with the piles 2 depending well below the bars 3a and into the ground therebeneath. The top 1 in an actual installation may be made of any usual or suitable pier construction material, such as, for example, of metal or reinforced concrete or a combination of them. The usual pier construction is intended, to which is attached the fender unit construction. Braces 27a are connected between the uprights 9 and the short rearwardly extending beams 12 to make rigid the triangular frames each formed of an upright 9, a beam 10 or 12 and the brace 27 or 27a.

It will be understood that various changes in the details, materials, and arrangements of parts, which have been herein described and illustrated in order to explain the nature of the invention, may be made by those skilled in the art within the principle and scope of the invention as expressed in the appended claims.

I claim:

1. A shock-absorbing structure, comprising an upright fixed support, forwardly and downwardly inclined rails carried by said support, in side by side but spaced apart relation along said support, an impact element having rearward extensions running on said rails and spaced apart at different distances along said rails, a plurality of separate weights also sliding on said inclined rails and arranged in succession along the lengths of the rails, and lost motion connections between one of said extensions and the upper one of said weights and between said weights, whereby when an impact occurs against said element the initial travel of said element up said rails will at first be free of said weights and then the weights will be picked up one by one at different points of travel of said element and moved up the rails to offer increasing increments of sliding resistance to travel by the element up the rails and hence increasing resistance to the same impact.

2. A shock-absorbing marine pier construction for absorbing the impact energies of berthing vessels against the pier, and providing protection for the pier and the vessel, which comprises said pier, rails carried by said pier at intervals along it and extending upwardly and rearwardly from that face of the pier toward which a vessel may move in being berthed against the pier, an impact element disposed in front of and spaced from said pier face and having an upstanding wall against which a berthing vessel may bump, and at its face toward said pier having sliding and confining contact with said rails at spaced intervals along each rail which prevents separation of said element from said rails, means for limiting downward sliding movement of said element on said rails, and means for opposing the upward sliding movement of said element on said rails in spaced steps with progressively greater forces for progressively greater extents of such upward sliding movement of said element under the impact thereagainst of a berthing vessel, said means for opposing movement of said element having a plurality of weights arranged in side by side relation in succession on said rails and slidable thereon with a lost motion connection from said element to the upper one of said weights and from weight to weight down said rails.

3. The construction according to claim 2, wherein said weights have spacers between them and carried by one weight of each abutting pair in which to house the last lost motion connection between adjacent weights.

4. The construction according to claim 2, wherein said lost motion connections are chains loosely coupling said element to one weight and loosely coupling said weights to one another.

5. A shock-absorbing marine pier fender construction for absorbing the impact energies of berthing vessels against a pier, and providing protection from such energies for said pier and vessels, which comprises an upstanding part of said pier, parallel rails spaced apart along said pier and carried by said upstanding part in positions inclined upwardly and rearwardly away from that pier face toward which a vessel may move in being berthed against the pier, an impact element having an upstanding impact wall disposed in front of and spaced from said pier face, vertically spaced apart, rearward extensions therefrom, and bars carried by said extensions from said upstanding wall and of lengths to extend between and slide on said rails at intervals spaced apart therealong, means for confining said bars from separation from said rails during their sliding movement on the rails, means for limiting downward sliding of said bars on said rails to a position in which said impact wall is spaced from said pier face and free to move toward said upstanding part of said pier upon impact of a vessel thereagainst, and means connected to one of said bars for opposing, by sliding friction, the upward sliding movement of said element on said rails with progressively greater forces for progressively greater extents of such upward movements of said bars on said rails, said means connected to one of said bars including a plurality of weight members extending between and frictionally slidable on said rails side by side in succession on said rails, with lost motion connections between said upper bar and the upper one of said weight members and between said weight members, whereby said element in moving up said rails will pick up said weights in succession drag them up the rails, and provide increments of increasing opposition to the impact forces that move said impact wall toward said pier.

6. A shock-absorbing marine pier construction for absorbing the impact energies of berthing vessels against a pier and providing protection from such energies for said pier and vessels, which comprises said pier, parallel rails spaced apart along and carried by said pier in positions inclined upwardly and rearwardly away from that pier face against which a vessel tends to bump when being berthed at such pier, an upstanding fender wall disposed in front of and spaced from said pier face and in front of said rails, extensions from said fender wall rearwardly towards said pier at different vertical distances along said fender wall, a bar carried by the rear end of each extension and extending between and frictionally slidable on and slidingly confined to said rails, the distance between said bars being substantially less than the lengths of the rails and providing space for sliding movement of both bars in directions up and down the rails, means for limiting the sliding movements of said bars on said rails in both up and down directions, weight members extending between and frictionally and slidingly guided by said rails, arranged in succession, one above another, on said rails, and lost motion connections between one of said bars and an end one of said weight members, and also between said members, and being picked up and moved upwardly along said rails, one by one in succession at intervals in the travel of the said bars up the rails as said impact wall is pushed toward said pier by a vessel being berthed at such pier.

7. The construction according to claim 6, wherein said one bar having a lost motion connection to a weight member is the upper one of the bars, and the lost motion connections are loose, flexible connectors coupling the upper bar to the upper weight member and the weight members to one another.

8. A shock-absorbing marine pier fender construction for absorbing the impact energies of berthing vessels against a pier, and providing protection from such energies for said pier and vessels, which comprises an upstanding part of said pier, parallel rails spaced apart along said pier and carried by said upstanding part in positions inclined upwardly and rearwardly away from that pier face toward which a vessel may move in being berthed against the pier, an impact element having an upstanding impact wall that is disposed in front of and spaced from said pier face, means frictionally and slidingly mounting said element on said rails for movement of said element in directions up and down said rails, means limiting the movements of said element up and down said rails, means releasably confining said element against separation from said rails in directions normal to the lengths of the rails, a plurality of weight members extending between and frictionally sliding on said rails and arranged in succession along and on said rails, lost motion connections between said impact element and one end weight member and between adjacent weight members, whereby as the impact element is moved up the rails by impact forces from a vessel being berthed at that pier, the weights will be pulled in succession up the rails to add increasing resistance to the impact forces with increased extent of movement of said element up the rails.

9. A shock-absorbing marine pier construction for absorbing the impact energies of berthing vessels against a pier and providing impact protection from such energies for the vessel and the pier, which comprises a pier, a plurality of parallel rails arranged side by side but spaced apart along and carried by said pier in positions inclined upwardly and inwardly from an upstanding face of the pier, an impact element having an upstanding impact wall disposed in front of and spaced from said face in a position to be engaged by a vessel moving toward said pier face, said element also having rearward extensions toward the pier at vertically spaced apart portions of said wall, a friction bar extending between and frictionally sliding on the rails and attached to each of said rearward extensions, each said bar and rail having cooperating means for confining each bar to sliding engagement with the rails, means for limiting the movements of said element up and down said rails, a group of weight members extending between and sliding upon said rails in the portions of the rails between the areas of travel thereon of said bars, a lost motion connection between said element and one end weight member of said group, and other lost motion connections between adjacent weight members of the group, whereby when said element is pushed up said rails by impact thereon of a berthing vessel, after an initial free movement of said element it will pick up and drag with it up the rails first one and then the others in succession, which members will offer progressively greater opposition to the movement of said element up the rails with progressively greater movements of said element up the rails due to progressively greater impact forces on said element from a vessel being berthed at that pier.

10. The construction according to claim 9, and additional weight carried by the upper one of said rearward extensions in proximity to the said bar on its rear end, for partially counterbalancing some of the weight of said impact wall and increasing the friction on the rails of the upper one of said bars.

References Cited by the Examiner
UNITED STATES PATENTS

| | | | |
|---|---|---|---|
| 12,523 | 3/55 | Lawrence | 61—48 |
| 2,039,151 | 4/36 | Dubois | 61—48 |
| 2,391,612 | 12/45 | Baker | 61—48 |
| 2,892,315 | 6/59 | Blancato | 61—48 |
| 3,036,437 | 5/62 | Pogonowski | 61—48 |

FOREIGN PATENTS

| | | |
|---|---|---|
| 749,283 | 5/56 | Great Britain. |
| 796,440 | 6/58 | Great Britain. |
| 408,199 | 3/10 | France. |

EARL J. WITMER, *Primary Examiner.*

JACOB L. NACKENOFF, *Examiner.*